United States Patent
Quine

(10) Patent No.: US 7,859,563 B2
(45) Date of Patent: Dec. 28, 2010

(54) SYSTEM AND METHOD FOR SYNCHRONIZING A STROBE IN VIDEO IMAGE CAPTURING

(75) Inventor: Douglas B Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 2471 days.

(21) Appl. No.: 10/650,511

(22) Filed: Aug. 28, 2003

(65) Prior Publication Data

US 2005/0046694 A1    Mar. 3, 2005

(51) Int. Cl.
*H04N 5/253* (2006.01)
*H04N 7/18* (2006.01)

(52) U.S. Cl. ........................................ 348/91
(58) Field of Classification Search ............ 348/61, 348/91

See application file for complete search history.

(56) References Cited

U.S. PATENT DOCUMENTS 3,674,924 A * 7/1972 Fischer et al. .............. 348/91

* cited by examiner

*Primary Examiner*—Mehrdad Dastouri
*Assistant Examiner*—Jeremaiah C Huber
(74) *Attorney, Agent, or Firm*—Michael J. Cummings; Angelo N. Chaclas

(57) ABSTRACT

A method and system for use in viewing a mail item moving in a mailing machine. A video camera is used to acquire an image of the mail item, and a light source triggered by one of the vertical sync pulses provided by the video camera is used to provide repeated short flashes of light to illuminate the mail item while its image is acquired by the camera. Preferably, a sensor is used to provide an arrival signal when the mail item enters the field-of-view of the camera so that the light source is triggered only when it is also enabled by the arrival signal. A video display device, operatively connected to the video camera, is used to display the acquired image for viewing. Alternatively, the acquired image is stored in a storage device for viewing at a later time.

1 Claim, 2 Drawing Sheets

SYSTEM AND METHOD FOR SYNCHRONIZING A STROBE IN VIDEO IMAGE CAPTURING

FIELD OF THE INVENTION

The present invention relates generally to video imaging and, more particularly, to capturing images of a mailpiece or other mail-related item in a mailing machine.

BACKGROUND OF THE INVENTION

Video cameras can be used to take pictures of a mailpiece, an enclosure document or other mail-related item in a mail sorter, mail inserter or other mailing machine for a variety of purposes. For example, paper handling and postal automation development teams can use those pictures to debug jam problems in a mailing machine and other motion control issues. Usually, the images acquired by the video cameras are displayed on video monitor for viewing. Because mail-related items usually move in a high speed in the mailing machine, the motion could blur the images acquired by the video camera, rendering it difficult to pinpoint the location of the edges of those items in relation to the machine.

It is desirable that the images of the mail-related item can be sharpened in order to reduce or eliminate the blurriness due to the motion of the mail-related item so as to allow an operator to have a good view of the item in relation to the mailing machine.

SUMMARY OF THE INVENTION

It is a primary objective of the present invention to provide a cost-effective method and device to produce one or more images of a mail-related item in motion appearing as if the motion is "frozen" when the image is displayed on a video monitor or the like. This objective can be achieved by a synchronization system that uses certain synchronization pulses in a video signal to trigger a strobe light, which is used to provide illumination when a video camera is used to acquire one or more images of the mail-related item.

The synchronization system of the present invention, preferably, uses a standard CCD video camera or camcorder, and a standard strobe unit with external triggering capability. Preferably, the strobe unit is capable of flashing at a 30 Hz rate (or 1800 times per minutes) for maximum speed. Depending upon the strobe duration, the effective shutter speeds of the camera can range between 1/50,000 second (with a 20 microsecond flash) and 1/1,000,000 second (with a 1 microsecond flash). As such, the motion of the mail-related item is not likely to produce any blur in the video image. Preferably, the ambient light of the imaging area is reasonably dark so as to enhance the contrast between image when the flash is on and the image when the flash is off. With sufficient illumination from the flash, the camera aperture can be significantly reduced so as to create the best possible depth of field of the camera and reduce the effect of ambient light on imaging. With an image recording medium such as a VHS tape, it is possible to record 2 hours of image data with normal resolution, and over 4 hours with reduced resolution. Normally, a camcorder can record at a maximum rate of 30 image frames per second. In a mailing machine moving mail-related items at 30 inches (76.2 cm) per second, the camcorder can capture an image every inch (2.54 cm) of movement.

The present invention will become apparent upon reading the description taken in conjunction with FIGS. 1 to 2f.

BRIEF DESCRIPTION OF THE DRAWINGS

FIG. 2d is a time plot showing a series of triggering pulses for causing a strobe light to flash when the mail-related item is present in the field-of-view of the imaging device.

FIG. 2e is a time plot showing a step function.

BEST MODE FOR CARRYING OUT THE INVENTION

Figure 1:
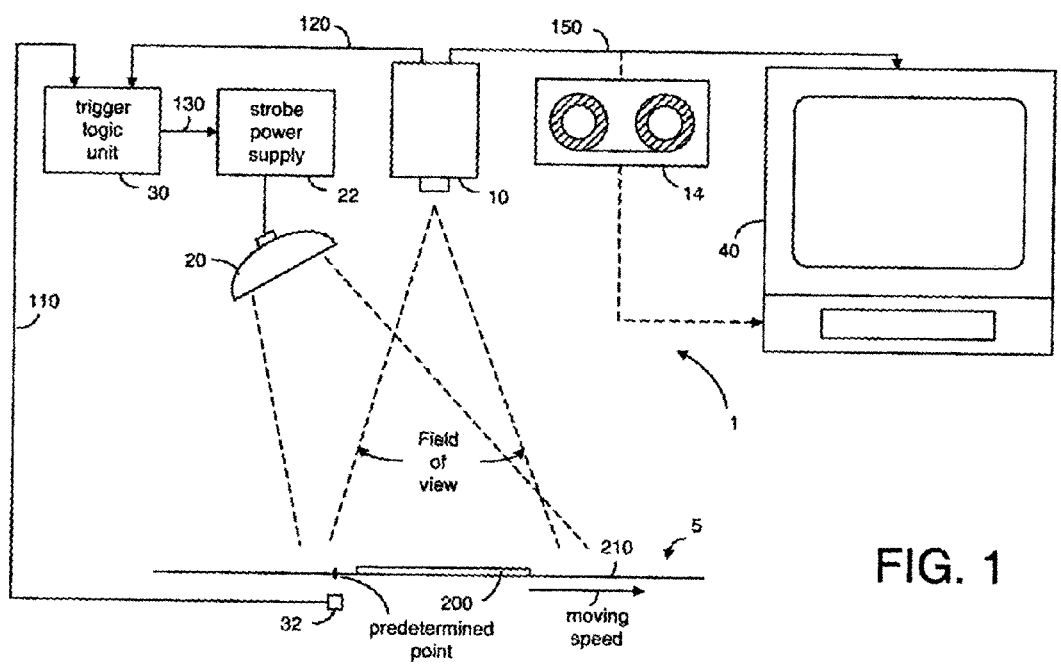
FIG. 1 is a schematic representation showing the image system, according to the present invention.

FIG. 1 shows the components in the imaging system 1 of the present invention. As shown, a mail-related item 200, such as an envelope 200 is transported along a path 210 in a machine 5 with at a certain speed. An imaging device 10, such as a camcorder, is positioned relative to the machine 5 such that the field of view of imaging device 10 covers a part or the entirety of the mail-related item 200. A light source 20, such as a strobe light, is used to provide illumination to the mail-related item. Preferably, the light source 20 can produce flashes at a rate of 30 times a second in short strobe duration. The light source 20 is powered by a power supply 22 that energizes the light source 20 when the power supply 22 is triggered by a trigger signal 130. According to the present invention, the trigger signal 130 is provided by a trigger logic unit 30. The trigger logic unit 30 accepts a sync signal 120 from the imaging device 10 such that the imaging device 10 can acquire images in synchronization with the flashes produced by the light source 20. Preferably, a sensor 32, such as a photosensor, is used to sense the presence of the mail-related item 200 in the field-of-view of the imaging device 10. The sensor 32 is capable of providing an output 110 when the mail-related item 200 has reached a predetermined point 230 in the path 210.

The images acquired by the imaging device 10 can be directly conveyed to a video display device 40 for display via video signal 150. Alternatively, the images can be stored in a tape 14 or the like so that they can be displayed for viewing at a later time.

It is known in the art that, in a camcorder, the image pattern of electrical charges on the CCD, for example, are converted to a video signal in a sequential order of picture elements (pixels) in a scanning process. The scanning process provides a line-by-line scan until the image has been scanned from top to bottom to complete one field scan. At the end of each field scan, the video signal is blanked while the scanning beam returns from the bottom to the top of the image. In order to avoid the problem of flickering, however, two interlaced fields are used to complete a single video frame. Blanking of the scanning beam during the return trace is provided for in the video signal by a certain waveform. In a video display device, this waveform is used for synchronizing video signals as the video image is displayed. The blanking waveform at the end of each field is also referred to as a vertical or V-sync pulse. Schematically, the V-sync pulses are depicted in FIG. 2a.

According to the present invention, the V-sync pulses from the camcorder 10 are used for providing synchronization between image acquisition by the camcorder 10 and the light source 20. Thus, the sync signal 120 contains a plurality of V-sync pulses.

Figure 2A:
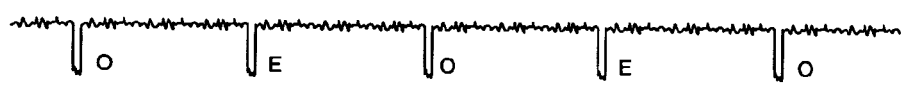
FIG. 2a is a time plot showing a series of V-sync signals in a typical video camera.
Figure 2B:
FIG. 2b is a time plot showing a series of pulses corresponding to the V-sync signals.
Figure 2C:
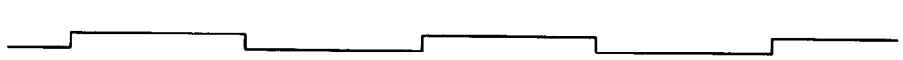
FIG. 2c is a time plot showing a series of square pulses formed from a divide-by-two logic chip, corresponding to the series of pulses of FIG. 2b.
Figure 2D:
FIG. 2d is a time plot showing a series of short pulses, each corresponding to a positive-going edge of the square pulses of FIG. 2c.
Figure 2E:
FIG. 2e is a time plot showing the step-like function indicative of the presence of a mail-related item in the field-of-view of the imaging device.
Figure 2F:
FIG. 2f is a time plot showing trigger pulses.

The V-sync pulses are processed in the trigger logic unit 30 into the trigger signal 130 as shown in FIGS. 2a to 2f. As mentioned above, there are two V-sync pulses, associated with two interlaced fields, for every image frame. Thus, only one of the two is used for triggering the light source 20. The two interlaced fields for each frame are herein referred to as odd and even fields, and the two associated V-sync pulses are referred to as odd (O) and even (E) sync pulses, as shown in FIG. 2a. Advantageously, the V-sync pulses are shaped by a pulse shaping circuit, such as a comparator, into a series of rectangular pulses, as shown in FIG. 2b. Through a divided-by-two circuit, such as a flip-flop, the rectangular pulses are converted into a series of square pulses, as shown in FIG. 2c. With an edge triggering circuit, such as a monostable logic chip, the square-pulses are converted into a series of short pulses, each for an image frame, as shown in FIG. 2d. Preferably, the light source 20 is triggered to produce flashes only when the mail-related item 200 is present in the field-of-view of the camcorder 10. Thus, the output 110 of the sensor 32 is processed by the trigger logic unit 30 into a step-like function, as shown in FIG. 2e, to enable an AND-gate, for example, to admit the trigger pulses only when the mail-related item 200 is present in the field-of-view of the camcorder 10, as shown in FIG. 2f. Each of these trigger pulses is denoted as the trigger signal 130 in FIG. 1.

With the trigger signal 130, an image of a mail-related item passing through the field-of-view of the camera 10 is acquired at the start of a video frame. With the flash duration of 20 microseconds, an envelope moving at a speed of 30 inches (762 mm) per second will move only approximately 0.6 mils (0.015 mm) during the flash illumination. Thus, the envelope is effectively stationary and no significant blur is observable when its images are displayed on a video display device 40.

With the present invention, not only the leading and trailing edges of the mail-related item can be located precisely as if the mail-related item is stationary at the time of image acquisition, but the features and messages on the mail-related item can also be discerned in greater clarity. For example, the image of a postal indicia, a bar-code symbol, the mailing address and so forth can be easily read.

It should be noted that the present invention has been disclosed with regard to acquiring the images of a moving mail-piece in a mailing machine. However, the imaging system and method, according to the present invention, can also be applicable to acquiring the images of a moving part in any mechanical/moving system, where "frozen" images are desirable. In a standard video imaging system where an image frame interlaced with two image fields is produced 30 times a second, the present invention illuminates the entire image at 30 Hz, resulting in 30 "frozen moments" in time per second. Likewise, if the standard system produces 25 interlaced images per second, the present invention illuminates at 25 Hz, resulting in 25 "frozen moments" in time per second. However, in a non-interlaced video image system where a non-interfaced image is fully refreshed 60 times a second, for example, the present invention illuminates the entire image at 60 Hz, resulting in 60 "frozen moments" in time per second. In that case, the divided-by-two circuit as described in conjunction with FIG. 2c is not required. Furthermore, it is also possible to produce only 20, 15 or 10 "frozen moments" per second using the standard video image system, which produces 30 interlaced images per second. In that case, the divided-by-two circuit in the trigger logic unit will be replaced by a divided-by-three circuit, a divided-by-four circuit, and a divided-by-six circuit, respectively, in order to suit the flashing capacity of the illuminating source 20. Moreover, the video tape 14 as illustrated in FIG. 1 can be replaced by a DVD, a flash memory card, a computer hard disk, or other image recording system. The present invention is equally applicable to analog and digital image recording systems, so long as synchronization pulses are provided by the imaging device. Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. An image acquisition system for use in viewing a moving item in a path in a mailing machine, said imaging system comprising:

an imaging device, having a field of view covering at least a portion of the path, for acquiring an image of the moving item, the image including a discernible feature of the moving item;

an illuminating source, positioned relative to the field-of-view of the imaging device, for providing a flash of light for illuminating at least a part of the moving item entering the field-of-view of the imaging device;

a detection mechanism, positioned relative to the path, for providing an arrival signal indicating that the moving item entering the field-of-view has reached a predetermined point in the path;

an electronic circuit, in response to the arrival signal, for providing a triggering signal based on a synchronization pulse from the imaging device to cause the illuminating source to provide the flash of light for illuminating said moving item while the image is acquired, wherein the flash of light has a flash duration sufficiently short as compared to the motion of the moving item so as to produce said discernible feature of the moving mail-related item in said image; and wherein the imaging device comprises a video camera providing two vertical synchronization pulses for each image frame, and the synchronization pulse is selected from one of said two vertical synchronization pulses.

* * * * *